United States Patent
Hiraoka et al.

(10) Patent No.: US 9,153,817 B2
(45) Date of Patent: Oct. 6, 2015

(54) LITHIUM ION SECONDARY BATTERY

(75) Inventors: Tatsuki Hiraoka, Osaka (JP); Taisuke Yamamoto, Nara (JP); Katsumi Kashiwagi, Nara (JP); Masaya Ugaji, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 135 days.

(21) Appl. No.: 13/320,464

(22) PCT Filed: Apr. 26, 2011

(86) PCT No.: PCT/JP2011/002433
§ 371 (c)(1),
(2), (4) Date: Nov. 14, 2011

(87) PCT Pub. No.: WO2011/161863
PCT Pub. Date: Dec. 29, 2011

(65) Prior Publication Data
US 2012/0264013 A1  Oct. 18, 2012

(30) Foreign Application Priority Data
Jun. 25, 2010 (JP) .................... 2010-144917

(51) Int. Cl.
H01M 4/62 (2006.01)
H01M 4/134 (2010.01)
(Continued)

(52) U.S. Cl.
CPC .............. *H01M 4/134* (2013.01); *H01M 4/621* (2013.01); *H01M 10/052* (2013.01); *H01M 10/0566* (2013.01); *Y02E 60/122* (2013.01); *Y02T 10/7011* (2013.01)

(58) Field of Classification Search
CPC ........................................ H01M 4/62
USPC ............................................ 429/211
See application file for complete search history.

(56) References Cited

U.S. PATENT DOCUMENTS

2002/0068218 A1* 6/2002 Mao et al. ............... 429/223
2003/0108797 A1* 6/2003 Iijima et al. ............. 429/254
(Continued)

FOREIGN PATENT DOCUMENTS

CN   101651234 A    2/2010
JP   07-335221 A   12/1995
(Continued)

OTHER PUBLICATIONS

Chinese Office Action with partial English Translation issued in the corresponding Chinese Patent Application No. 201180002206.2 mailed Sep. 2, 2013.

*Primary Examiner* — Ula Ruddock
*Assistant Examiner* — Jacob Marks
(74) *Attorney, Agent, or Firm* — McDermott Will & Emery LLP

(57) ABSTRACT

Disclosed is a lithium ion secondary battery including: a positive electrode including a positive electrode active material layer comprising a positive electrode active material capable of absorbing and releasing lithium ions, and a positive electrode current collector; a negative electrode including a negative electrode active material layer comprising an alloy-formable active material, and a negative electrode current collector; a separator interposed between the positive electrode and the negative electrode; and a non-aqueous electrolyte. The positive electrode active material layer has an easily swellable resin having a degree of swelling with the non-aqueous electrolyte of 20% or more, and the negative electrode active material layer has a hardly swellable resin having a degree of swelling with the non-aqueous electrolyte of less than 20%.

13 Claims, 4 Drawing Sheets

(51) Int. Cl.
*H01M 10/052* (2010.01)
*H01M 10/0566* (2010.01)

(56) References Cited

U.S. PATENT DOCUMENTS

| | | | |
|---|---|---|---|
| 2004/0131945 A1* | 7/2004 | Zushi et al. | 429/316 |
| 2005/0191556 A1 | 9/2005 | Kim et al. | |
| 2006/0099505 A1 | 5/2006 | Fujino et al. | |
| 2009/0186274 A1* | 7/2009 | Wakita et al. | 429/217 |
| 2010/0261057 A1* | 10/2010 | Shibuya | 429/212 |

FOREIGN PATENT DOCUMENTS

| | | |
|---|---|---|
| JP | 11-121013 A | 4/1999 |
| JP | 2002-110249 A | 4/2002 |
| JP | 2004-146253 A | 5/2004 |
| JP | 2005-197258 A | 7/2005 |
| JP | 2007-141504 A | 6/2007 |
| JP | 2009-205903 A | 9/2009 |

* cited by examiner

LITHIUM ION SECONDARY BATTERY

RELATED APPLICATIONS

This application is the U.S. National Phase under 35 U.S.C. §371 of International Application No. PCT/JP2011/002433, filed on Apr. 26, 2011, which in turn claims the benefit of Japanese Application No. 2010-144917, filed on Jun. 25, 2010, the disclosures of which Applications are incorporated by reference herein.

TECHNICAL FIELD

The present invention relates to lithium ion secondary batteries. More specifically, the present invention relates to improvement in the circulation of non-aqueous electrolyte within a lithium ion secondary battery which includes a negative electrode comprising an alloy-formable active material.

BACKGROUND ART

Lithium ion secondary batteries including an alloy-formable active material as a negative electrode active material (hereinafter referred to as "alloy-type secondary batteries") have higher capacities and higher energy densities than conventional lithium ion secondary batteries including graphite as a negative electrode active material. Therefore, alloy-type secondary batteries are expected not only as power sources for electronic equipment, but also as main power sources or auxiliary power sources for transportation equipment or machining equipment. Examples of a known alloy-formable active material include a silicon-based active material such as silicon and a silicon oxide, and a tin-based active material such as tin and a tin oxide.

In an alloy-formable active material, internal stress is generated during charge due to excessive expansion of its particles. This may cause separation of the negative electrode active material layer from the negative electrode current collector, or deformation of the negative electrode, and thus, the cycle characteristics of the battery may deteriorate. In order to solve such a problem of an alloy-formable active material, it is proposed to form a coating made of a resin material on an outer surface of the negative electrode active material layer including an alloy-formable active material.

Patent Literature 1 discloses a negative electrode in which a polymer film layer composed of a polymer support and a cross-linkable monomer is formed on an outer surface of a negative electrode active material layer including lithium alloy particles.

Patent Literature 2 discloses a negative electrode including: a negative electrode current collector; a negative electrode active material layer being supported on a surface of the negative electrode current collector, including an alloy-formable active material, and having recesses and protrusions on its outer surface; and a resin layer formed in the recesses, wherein the outer surface of the resin layer is flushed with the outer surfaces of the protrusions.

CITATION LIST

Patent Literature

[PTL 1] Japanese Laid-Open Patent Publication No. 2005-197258
[PTL 2] Japanese Laid-Open Patent Publication No. 2009-205903

SUMMARY OF INVENTION

Technical Problem

In alloy-type secondary batteries, the cycle characteristics deteriorate in association with expansion and contraction of the alloy-formable active material, and in addition, a significant deterioration in the cycle characteristics may occur with increase in the number of charge/discharge cycles. The present inventors have conducted studies on the causes of the above problems, and obtained the following findings.

In a negative electrode including an alloy-formable active material, many small gaps are formed in the negative electrode active material layer as a result of repeated expansion and contraction of the alloy-formable active material during charge and discharge. When the alloy-formable active material contracts during discharge, the volume of the above-mentioned gaps is increased, and the non-aqueous electrolyte contained in the alloy-type secondary battery is absorbed into the gaps by capillarity. As a result, the non-aqueous electrolyte is unevenly distributed in the negative electrode, and in the positive electrode, although locally impregnated with the non-aqueous electrolyte, a large part thereof becomes depleted of the non-aqueous electrolyte.

Hence, the charge/discharge reaction is concentrated at a portion impregnated with non-aqueous electrolyte in the positive electrode (hereinafter referred to as an "impregnated portion"). Particularly during discharge, lithium ions released from the negative electrode are exclusively absorbed into the impregnated portion, and the impregnated portion falls into an over-discharged state, causing disorder in the crystal structure of the impregnated portion. This accelerates the deterioration of the positive electrode. The present inventors have considered that this is responsible for the deterioration in the cycle characteristics. The present inventors have studied intensively in order to suppress the uneven distribution of non-aqueous electrolyte in a negative electrode including an alloy-formable active material, and have arrived at the present invention.

The present invention intends to provide a lithium ion secondary battery which includes a negative electrode comprising an alloy-formable active material and is excellent in cycle characteristics.

Solution to Problem

A lithium ion secondary battery of the present invention includes: a positive electrode including a positive electrode active material layer comprising a positive electrode active material capable of absorbing and releasing lithium ions, and a positive electrode current collector; a negative electrode including a negative electrode active material layer comprising an alloy-formable active material, and a negative electrode current collector; a separator interposed between the positive electrode and the negative electrode; and a non-aqueous electrolyte. The positive electrode active material layer has an easily swellable resin having a degree of swelling with the non-aqueous electrolyte of 20% or more, and the negative electrode active material layer has a hardly swellable resin having a degree of swelling with the non-aqueous electrolyte of less than 20%.

Advantageous Effects of Invention

The present invention provides a lithium ion secondary battery having a high capacity and a high energy density and being excellent in cycle characteristics.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
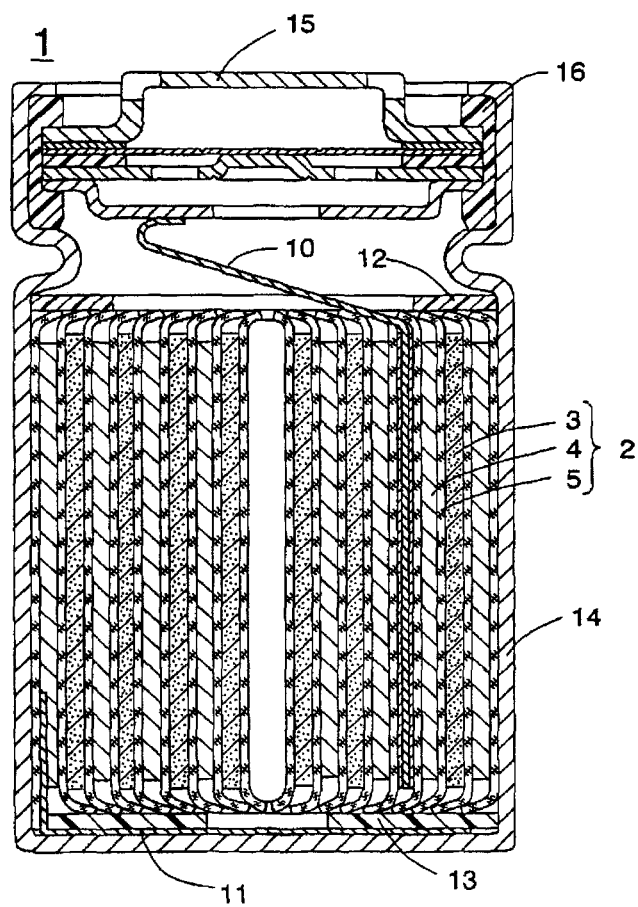
FIG. 1 A longitudinal cross-sectional view schematically showing the configuration of a lithium ion secondary battery according to one embodiment of the present invention.

A lithium ion secondary battery of the present invention includes: a positive electrode which includes a positive electrode active material layer comprising a positive electrode active material capable of absorbing and releasing lithium ions, and a positive electrode current collector; a negative electrode which includes a negative electrode active material layer comprising an alloy-formable active material, and a negative electrode current collector; a separator interposed between the positive electrode and the negative electrode; and a non-aqueous electrolyte. The positive electrode active material layer has an easily swellable resin having a degree of swelling with the non-aqueous electrolyte of 20% or more, and the negative electrode active material layer has a hardly swellable resin having a degree of swelling with the non-aqueous electrolyte of less than 20%.

For example, by including in the positive electrode an easily swellable resin whose ability to absorb non-aqueous electrolyte is high and including in the negative electrode a hardly swellable resin whose ability to absorb non-aqueous electrolyte is low, the ability of the positive electrode to absorb non-aqueous electrolyte approaches that of the negative electrode. This allows impregnation of the non-aqueous electrolyte into the easily swellable resin included in the positive electrode, and therefore, depletion of electrolyte in a large part of the positive electrode can be suppressed. As a result, it becomes very unlikely to occur that: the positive electrode locally falls into an over-discharged state due to local concentration of charge/discharge reaction, and the crystal structure thereof is disordered. Therefore, the deterioration of the positive electrode can be remarkably suppressed, and the cycle characteristics of the battery can be improved. The lithium ion secondary battery of the present invention has a high capacity because of the inclusion of an alloy-formable active material, and exhibits excellent cycle characteristics, whether it is set as a low-output type or a high-output type.

The difference between the degree of swelling with the non-aqueous electrolyte of the easily swellable resin and that of the hardly swellable resin is preferably 10% to 150%. This can further improve the circulation of non-aqueous electrolyte within the battery.

The easily swellable resin is preferably present as a coating formed on an outer surface of the positive electrode active material layer. This allows the non-aqueous electrolyte to be easily dispersed throughout the entire positive electrode active material layer even during discharge. Thus, the charge/discharge reaction proceeds in the entire positive electrode active material layer. As a result, the deterioration of the positive electrode and the deterioration in the cycle characteristics associated therewith can be suppressed. The coating of the easily swellable resin preferably has a thickness of 1 μm to 5 μm. The coating having such a thickness can absorb the non-aqueous electrolyte in an amount necessary for the charge/discharge reaction to proceed, while maintaining the adhesion to the surface of the positive electrode active material layer, and can exhibit excellent lithium ion conductivity.

In another embodiment, it is preferable that the positive electrode active material layer includes a binder allowing the positive electrode active material to adhere to the positive electrode current collector, and the binder comprises an easily swellable resin. By configuring as above, the easily swellable resin can be distributed evenly in the positive electrode active material layer. Thus, it becomes possible to disperse the non-aqueous electrolyte throughout the entire positive electrode active material layer, and the deterioration of the positive electrode and the deterioration in the cycle characteristics associated therewith can be suppressed.

The hardly swellable resin is preferably present as a coating formed on an outer surface of the negative electrode active material layer. This suppresses the non-aqueous electrolyte from being impregnated more than necessary into the negative electrode active material layer, and allows the non-aqueous electrolyte to be also dispersed throughout the positive electrode active material layer. The coating of the hardly swellable resin preferably has a thickness of 0.1 μm to 2 μm. The coating having such a thickness can suppress the impregnation of the non-aqueous electrolyte more than necessary into the negative electrode active material layer, while maintaining its adhesion to the surface of the negative electrode active material layer and its lithium ion conductivity.

The negative electrode active material layer in the above embodiments is preferably an aggregate of a plurality of particulate bodies (e.g., columnar bodies) being supported on the surface of the negative electrode current collector and including the alloy-formable active material. The negative electrode active material layer configured as above contributes greatly in achieving a higher capacity of the battery and improving the cycle characteristics; however, its ability to absorb non-aqueous electrolyte during discharge is high, and thus, the non-aqueous electrolyte tends to be unevenly distributed in the negative electrode. As such, by combining with each of the above-described embodiments, the uneven distribution of non-aqueous electrolyte in the negative electrode can be suppressed, and the cycle characteristics can be further improved.

In yet another embodiment, the negative electrode active material layer may include an alloy-formable active material and a binder, and the binder may comprise a hardly swellable resin. In this embodiment also, the local distribution of non-aqueous electrolyte in the negative electrode can be suppressed, and the circulation of non-aqueous electrolyte within the battery can be improved.

The easily swellable resin is preferably a fluorocarbon resin, and more preferably at least one selected from the group consisting of (A) a copolymer of hexafluoropropylene and vinylidene fluoride containing 3 mol % to 20 mol % of hexafluoropropylene units, and (B) a copolymer of hexafluoropropylene and tetrafluoroethylene containing 3 mol % to 20 mol % of hexafluoropropylene units. By using these easily swellable resins, the dispersibility and retainability of non-aqueous electrolyte in the positive electrode active material layer can be improved.

The hardly swellable resin is preferably a fluorocarbon resin, and more preferably at least one selected from the group consisting of (C) polyvinylidene fluoride, (D) polytetrafluoroethylene, (E) a copolymer of hexafluoropropylene and vinylidene fluoride containing up to 1 mol % of hexafluoropropylene units, and (F) a copolymer of hexafluoropropylene and tetrafluoroethylene containing up to 1 mol % of hexafluoropropylene units. By using these hardly swellable resins, the excessive impregnation of non-aqueous electrolyte into the negative electrode active material layer can be suppressed, and the circulation of non-aqueous electrolyte within the battery can be improved.

The alloy-formable active material is preferably at least one selected from the group consisting of a silicon-based active material and a tin-based active material. These alloy-formable active materials not only have high capacities but also are excellent in handleability.

Figure 2:
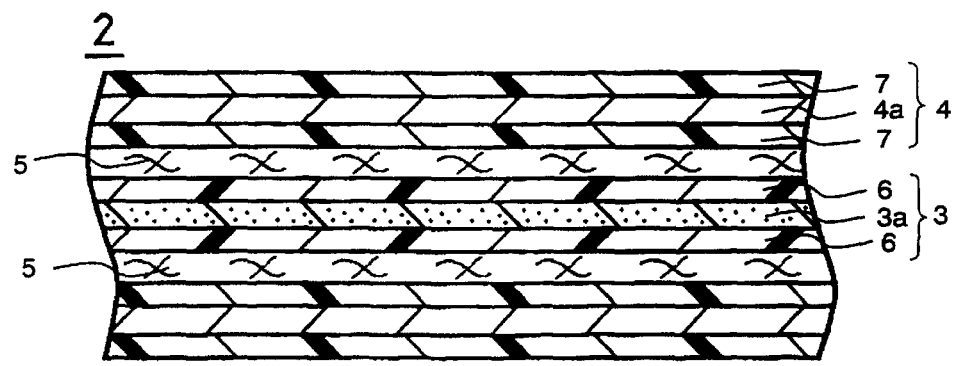
FIG. 2 A longitudinal cross-sectional view schematically showing the configuration of an essential part of an electrode group included in the lithium ion secondary battery shown in FIG. 1.
Figure 3:
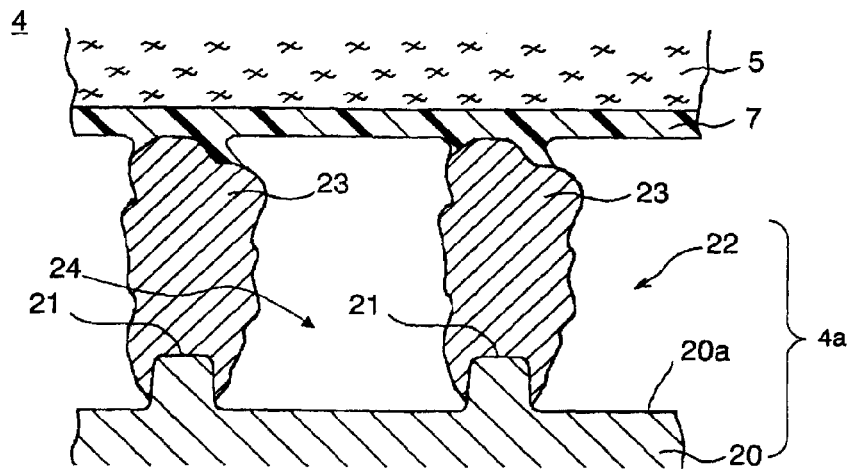
FIG. 3 A longitudinal cross-sectional view schematically showing the configuration of a negative electrode included in the lithium ion secondary battery shown in FIG. 1.
Figure 4:
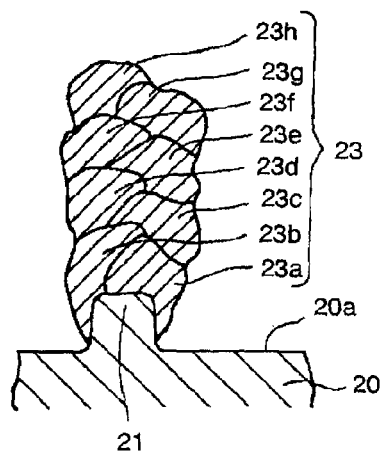
FIG. 4 A longitudinal cross-sectional view schematically showing the configuration of a particulate body included in the negative electrode shown in FIG. 3.

FIG. 1 is a longitudinal cross-sectional view schematically showing the configuration of a lithium ion secondary battery 1 according to one embodiment of the present invention. FIG. 2 is a longitudinal cross-sectional view schematically showing the configuration of an essential part of an electrode group 2 included in the lithium ion secondary battery 1 shown in FIG. 1. FIG. 3 is a longitudinal cross-sectional view schematically showing the configuration of a negative electrode 4 included in the lithium ion secondary battery 1 shown in FIG. 1. FIG. 4 is a longitudinal cross-sectional view schematically showing the configuration of a particulate body 23 included in the negative electrode 4 shown in FIG. 3.

The lithium ion secondary battery 1 includes the wound electrode group 2 (hereinafter simply referred to as the "electrode group 2") formed by winding a positive electrode 3 with an easily swellable coating 6 formed on an outer surface of the positive electrode active material layer of a positive electrode main body 3a, and the negative electrode 4 with a hardly swellable coating 7 formed on an outer surface of the negative electrode active material layer of a negative electrode main body 4a, with a separator 5 interposed therebetween. The electrode group 2, on both ends of which in the longitudinal direction thereof, an upper insulating plate 12 and a lower insulating plate 13 are mounted, respectively, is housed together with a non-aqueous electrolyte (now shown) in a bottomed cylindrical battery case 14. The battery case 14 has an opening in one end in the longitudinal direction thereof, and the other end thereof (the bottom) functions as a negative electrode terminal. A sealing plate 15 is mounted at the opening of the battery case 14, with an insulating gasket 16 interposed therebetween, and functions as a positive electrode terminal. The positive electrode lead 10 provides electrical conduction between the positive electrode current collector in the positive electrode 3 and the sealing plate 15. The negative electrode lead 11 provides electrical conduction between a negative electrode current collector 20 in the negative electrode 4 as shown in FIG. 3 and the battery case 14.

In the lithium ion secondary battery 1 of this embodiment, the easily swellable coating 6 is formed on an outer surface of the positive electrode active material layer of the positive electrode main body 3a, and as shown in FIG. 3, the hardly swellable coating 7 is formed on an outer surface of a negative electrode active material layer 22 of the negative electrode main body 4a. The easily swellable coating 6 comprises an easily swellable resin having a degree of swelling with the non-aqueous electrolyte of 20% or more. The hardly swellable coating 7 comprises a hardly swellable resin having a degree of swelling with the non-aqueous electrolyte of less than 20%. By configuring as above, the difference between the non-aqueous electrolyte-absorbing ability of the positive electrode 3 as a whole, i.e., the positive electrode main body 3a plus the easily swellable coating 6, and that of the negative electrode 4 as a whole, i.e., the negative electrode main body 4a plus the hardly swellable coating 7, becomes very small, and thus, the circulation of non-aqueous electrolyte within the battery 1 can be maintained favorably.

In particular, even if the ability of the negative electrode 4 to absorb non-aqueous electrolyte is enhanced during discharge, the non-aqueous electrolyte is dispersed throughout the entire positive electrode 3, without being unevenly distributed in the negative electrode 4. As such, the positive electrode 3 is prevented from being locally impregnated with the non-aqueous electrolyte, leaving the other portions depleted of the non-aqueous electrolyte. As a result, the charge/discharge reaction will not be concentrated at the portion impregnated with the non-aqueous electrolyte, and the variations in the depths of charge and discharge in the positive electrode 3 are remarkably reduced. In addition, it will not happen that, particularly during discharge, the portion impregnated with the non-aqueous electrolyte falls into an over-discharged state, causing disorder in its crystal structure. Therefore, the deterioration of the positive electrode 3 can be suppressed.

As shown in FIG. 2, the electrode group 2 has a layer configuration in which the positive electrode 3 including the easily swellable coatings 6 formed on outer surfaces of the positive electrode main body 3a, and the negative electrode 4 including the hardly swellable coatings 7 formed on outer surfaces of the negative electrode main body 4a are laminated with the separator 5 interposed therebetween.

The positive electrode 3 includes: the positive electrode main body 3a including a positive electrode current collector and positive electrode active material layers formed on both surfaces of the positive electrode main body 3a; and the swellable coatings 6 formed on outer surfaces of the positive electrode active material layers on both sides of the positive electrode main body 3a. The outer surface of the positive electrode active material layer is a surface of the positive electrode active material layer opposite to the surface being in contact with the positive electrode current collector. It should be noted that although the positive electrode active material layer is formed on each of both sides of the positive electrode current collector in this embodiment, the positive electrode active material layer may be formed on one side of the positive electrode current collector.

The easily swellable coating 6 comprises an easily swellable resin having a degree of swelling with the non-aqueous electrolyte of 20% or more (hereinafter simply referred to as an "easily swellable resin") and has lithium ion conductivity. By forming the easily swellable coating 6 on the outer surface of the positive electrode active material layer of the positive electrode main body 3a, the ability of the positive electrode 3 to absorb non-aqueous electrolyte is improved. As a result, the difference between the non-aqueous electrolyte-absorbing ability of the positive electrode 3 and that of the below-described negative electrode 4 is reduced, and thus, the circulation of non-aqueous electrolyte within the battery 1 is improved.

The easily swellable coating 6 can be formed by, for example, dissolving an easily swellable resin in an organic solvent to prepare a slurry, and applying the slurry onto the outer surface of the positive electrode active material layer, and drying the applied film. The application method is not particularly limited, and may be, for example, screen coating, die coating, comma coating, roll coating, bar coating, gravure coating, curtain coating, spray coating, air knife coating, reverse coating, dip coating, or dip and squeeze coating. The easily swellable coating 6 having a desired thickness can be formed by selecting, for example, the concentration of the easily swellable resin contained in the slurry, the type of the organic solvent used for the slurry, or the temperature of the slurry.

The degree of swelling with non-aqueous electrolyte herein referred to is measured as follows. First, a resin is dissolved in an organic solvent to prepare a resin solution, which is then applied onto a smooth glass surface, and the applied film is dried to give a 100-μm-thick sheet. This sheet is cut in the size of 10 mm×10 mm as a sample. On the other hand, ethylene carbonate and ethyl methyl carbonate are mixed in a ratio of 1:1 by volume, and $LiPF_6$ is dissolved in the resultant mixed solvent at a concentration of 1.0 mol/L, to prepare a non-aqueous electrolyte. The non-aqueous electrolyte is put in a sealed container, and the sample is dipped into the non-aqueous electrolyte for 24 hours while the liquid temperature is kept at 25° C. The degree of swelling is determined from the equation below, as a rate of increase from the mass (G) of the sample before dipping into the non-aqueous electrolyte to the mass (H) of the sample after dipping into the non-aqueous electrolyte.

$$\text{Degree of swelling (\%)} = \{(H-G)/G\} \times 100$$

The degree of swelling with non-aqueous electrolyte of the swellable resin (hereinafter simply referred to as the "degree of swelling of the easily swellable resin") is 20% or more, preferably 20% to 200%, and more preferably 100% to 150%. The easily swellable resin having such a degree of swelling can improve the ability of the positive electrode 3 to absorb non-aqueous electrolyte.

If the degree of swelling of the easily swellable resin is below 20%, the ability of the easily swellable coating 6 to absorb non-aqueous electrolyte is lowered, and the uneven distribution of non-aqueous electrolyte in the negative electrode 4 cannot be sufficiently suppressed, which may cause the positive electrode 3 to be depleted of the non-aqueous electrolyte. On the other hand, the degree of swelling of the easily swellable resin is too high, the easily swellable coating 6 is gelled, and thus, the adhesion of the easily swellable coating 6 to the outer surface of the positive electrode active material layer of the positive electrode main body 3a may become insufficient. When this happens, the non-aqueous electrolyte is not sufficiently circulated to the positive electrode 3, and the cycle characteristics of the battery 1 may deteriorate.

The easily swellable resin is not particularly limited and may be any resin as long as it has a degree of swelling of 20% or more, exhibits lithium ion conductivity upon contact with the non-aqueous electrolyte, and does not dissolve in the non-aqueous electrolyte, but is preferably a fluorocarbon resin and is more preferably (A) a copolymer of vinylidene fluoride and hexafluoropropylene or (B) a copolymer of tetrafluoroethylene and hexafluoropropylene. A copolymer which is the easily swellable resin having a degree of swelling of 20% or more can be obtained by setting the content of hexafluoropropylene units in each of the copolymers (A) and (B) to 3 mol % to 20 mol % of the total amount of the copolymer.

By setting the content of hexafluoropropylene units within the foregoing range, the ability of the easily swellable coating 6 to absorb non-aqueous electrolyte can be ensured, and the uneven distribution of non-aqueous electrolyte in the negative electrode 4 can be sufficiently suppressed. As such, the positive electrode 3 becomes less likely to be depleted of the non-aqueous electrolyte. Further, the gelation of the easily swellable coating 6 can be prevented, and the adhesion of the easily swellable coating 6 to the outer surface of the positive electrode active material layer of the positive electrode main body 3a can be sufficiently ensured.

The content of hexafluoropropylene units is preferably 5 mol % to 10 mol % of the total amount of the copolymer. This further reduces the difference between the non-aqueous electrolyte-absorbing ability of the positive electrode 3 and that of the negative electrode 4. As a result, the amount of the non-aqueous electrolyte to be dispersed throughout the positive electrode 3 is increased, and the circulation of non-aqueous electrolyte within the battery 1 is further improved, leading to a remarkable improvement in cycle characteristics of the battery 1.

The number average molecular weight of the easily swellable resin is preferable 10,000 to 2,000,000, and more preferably 200,000 to 500,000. This improves the adhesion of the easily swellable coating 6 to the outer surface of the positive electrode active material layer of the positive electrode main body 3a, and thus, the separation of the easily swellable coating 6 from the outer surface of the positive electrode active material layer is suppressed even when charge and discharge are repeated.

By setting the number average molecular weight within the foregoing range, the adhesion of the easily swellable coating 6 to the outer surface of the positive electrode active material layer of the positive electrode main body 3a becomes sufficient, and the easily swellable coating 6 is unlikely to be separated from the outer surface of the positive electrode active material layer even after an increased number of charge/discharge cycles. As a result, the deterioration in the circulation of non-aqueous electrolyte within the positive electrode 3 is suppressed. In addition, the lithium ion conductivity of the easily swellable coating 6 becomes sufficient, and the deterioration in the load characteristics of the battery 1 is also suppressed.

The amount of the easily swellable resin constituting the easily swellable coating 6 is preferably 0.1 parts by mass to 30 parts by mass and more preferably 2 parts by mass to 10 parts by mass, per 100 parts by mass of the positive electrode active material contained in the positive electrode main body 3a.

By setting the content of the easily swellable resin within the foregoing range, the difference between the non-aqueous electrolyte-absorbing ability of the positive electrode 3 and that of the negative electrode 4 is readily prevented from being increased. As a result, the positive electrode active material layer in the positive electrode 3a is unlikely to become depleted of the non-aqueous electrolyte, which makes it possible to suppress the deterioration of the crystal structure of the positive electrode active material layer and to suppress the deterioration in the cycle characteristics of the battery 1. In addition, the ability of the positive electrode 3 to absorb non-aqueous electrolyte can be maintained high, and the lithium ion conductivity of the easily swellable coating 6 can be sufficiently ensured. Thus, the deterioration in the load characteristics of the battery 1 can be suppressed.

The thickness of the easily swellable coating 6 is not particularly limited, but is preferably 1 μm to 5 μm. This can provide the easily swellable coating 6 having both an ability to absorb non-aqueous electrolyte and lithium ion conductivity in a well-balanced manner. By setting the thickness of the easily swellable coating 6 within the foregoing range, the ability of the positive electrode 3 to absorb non-aqueous electrolyte is readily suppressed from being lowered. In addition, the mechanical strength of the easily swellable coating 6 is prevented from being lowered, and thus, a separation of the easily swellable coating 6 from the outer surface of the positive electrode active material layer becomes less likely to occur. Further, the lithium ion conductivity of the easily swellable coating 6 can be sufficiently ensured, and the deterioration in the load characteristics of the battery 1 can be suppressed.

The positive electrode current collector included in the positive electrode main body 3a may be, for example, a metal foil made of a metal material such as aluminum, an aluminum alloy, stainless steel, and titanium. Preferred among the above metal materials are aluminum and an aluminum alloy. The thickness of the positive electrode current collector is not particularly limited, but is preferably 10 μm to 30 μm. The positive electrode current collector is belt-shaped in this embodiment.

The positive electrode active material layer formed on a surface of the positive electrode current collector contains a positive electrode active material, a binder, and a conductive agent. The positive electrode active material layer can be formed by, for example, applying a positive electrode material mixture slurry onto a surface of the positive electrode current collector, and drying and rolling the applied film. The positive electrode material mixture slurry can be prepared by, for example, mixing a positive electrode active material, a binder, and a conductive agent with a dispersion medium.

The positive electrode active material may be any known positive electrode active material, but is preferably a lithium-containing composite oxide or an olivine-type lithium salt.

The lithium-containing composite oxide is a metal oxide containing lithium and a transition metal element, or alternatively a metal oxide in which part of the transition metal element in the foregoing metal oxide is substituted by a different element. Examples of the transition metal element include Sc, Y, Mn, Fe, Co, Ni, Cu, and Cr. Preferred examples of the transition metal element include Mn, Co, and Ni. These transition metal elements may be used singly or in combination of two or more. Examples of the different element include Na, Mg, Zn, Al, Pb, Sb, and B. Preferred examples of the different element include Mg and Al. These different elements may be used singly or in combination of two or more.

Examples of the lithium-containing composite oxide include $Li_xCoO_2$, $Li_xNiO_2$, $Li_xMnO_2$, $Li_xCo_mNi_{1-m}O_2$, $Li_xCo_mM_{1-m}O_n$, $Li_xNi_{1-m}M_mO_n$, $Li_xMn_2O_4$, and $Li_xMn_{2-m}M_nO_4$, where M is at least one element selected from the group consisting of Na, Mg, Sc, Y, Mn, Fe, Co, Ni, Cu, Zn, Al, Cr, Pb, Sb, and B, $0<X≤1.2$, $0≤m≤0.9$, and $2.0≤n≤2.3$. Preferred among these is $Li_xCo_mM_1O_n$.

Examples of the olivine-type lithium salt include $LiZPO_4$ and $Li_2ZPO_4F$, where Z is at least one element selected from the group consisting of Co, Ni, Mn, and Fe.

In each of the above formulae representing the lithium containing composite oxide and olivine-type lithium salt, the number of moles of lithium is a value upon production of these and increases and decreases during charge and discharge. These positive electrode active materials may be used singly or in combination of two or more.

The binder may be an easily swellable resin, or alternatively a resin different from an easily swellable resin. Examples of the resin different from an easily swellable resin include: resin materials, such as polytetrafluoroethylene and polyvinylidene fluoride; and rubber materials, such as a styrene-butadiene rubber containing acrylic acid monomer (trade name: BM-500B, available from Zeon Corporation, Japan) and styrene-butadiene rubber (trade name: BM-400B, available from Zeon Corporation, Japan). The degree of swelling of the resin to be used as the binder for a positive electrode is usually about 1% to 5%. Examples of the conductive agent include: carbon blacks, such as acetylene black and Ketjen black; and graphites, such as natural graphite and artificial graphite. The contents of the binder and conductive agent in the positive electrode active material layer can be changed as appropriate according to, for example, the design of the positive electrode 3 and the battery 1.

Examples of the dispersion medium to be mixed with the positive electrode active material, binder, and conductive agent include: an organic solvent, such as N-methyl-2-pyrrolidone, tetrahydrofuran, and dimethylformamide; and water.

The negative electrode 4 includes: the negative electrode main body 4a including, for example, the negative electrode current collector 20 with a plurality of protrusions 21 formed on both surfaces thereof, and the negative electrode active material layer 22 comprising a plurality of particulate bodies 23 supported on the surfaces of the protrusions 21, as shown in FIG. 3; and the hardly swellable coating 7 formed on an outer surface of the negative electrode active material layer 22.

The hardly swellable coating 7 comprises a hardly swellable resin having a degree of swelling with the non-aqueous electrolyte of less than 20% (hereinafter simply referred to as a "hardly swellable resin") and has lithium ion conductivity. By forming the hardly swellable coating 7 on the outer surface of the negative electrode active material layer 22, the ability of the negative electrode 4 as a whole to absorb non-aqueous electrolyte can be suitably lowered.

Consequently, the ability of the positive electrode 3 to absorb non-aqueous electrolyte can approach that of the negative electrode 4. As a result, the circulation of non-aqueous electrolyte within the battery 1 is improved, the non-aqueous electrolyte is sufficiently dispersed around the positive electrode 3, and the deterioration of the positive electrode 3 is suppressed. As such, the cycle characteristics of the battery 1 can be remarkably improved.

The hardly swellable coating 7 of this embodiment is formed on the outer surface of the negative electrode active material layer 22. In this embodiment, the outer surface of the negative electrode active material layer 22 is composed of the surfaces of the tip ends of the particulate bodies 23. The hardly swellable coating 7 can be formed in the same manner as the easily swellable coating 6, except that a hardly swellable resin is used in place of the easily swellable resin. In forming the hardly swellable coating 7, in order to suppress the entry of the hardly swellable resin into gaps 24, it is preferable to adjust, for example, the concentration of the solution of the hardly swellable resin, or the molecular weight of the hardly swellable resin.

The degree of swelling with non-aqueous electrolyte of the hardly swellable resin (hereinafter simply referred to as the "degree of swelling of the hardly swellable resin") is less than 20%, and preferably 2% to 16%. When the degree of swelling of the hardly swellable resin exceeds 20%, the ability of the negative electrode 4 to absorb non-aqueous electrolyte may not be lowered suitably. On the other hand, when the degree of swelling of the hardly swellable resin is too low, the lithium ion conductivity of the hardly swellable coating 7 is reduced, which may cause the load characteristics of the battery 1 to deteriorate.

The hardly swellable resin is not particularly limited and may be any resin as long as it has a degree of swelling of less than 20%, exhibits lithium ion conductivity upon contact with the non-aqueous electrolyte, and does not dissolve in the non-aqueous electrolyte, but is preferably a fluorocarbon resin and is more preferably at least one selected from the group consisting of (C) polyvinylidene fluoride, (D) polytetrafluoroethylene, (E) a copolymer of hexafluoropropylene and vinylidene fluoride, and (F) a copolymer of hexafluoropropylene and tetrafluoroethylene.

The content of hexafluoropropylene units in each of the copolymers (E) and (F) is preferably 1 mol % or less. This allows a hardly swellable resin having a degree of swelling of less than 20% to be readily obtained. When the content of hexafluoropropylene units in each of the copolymers (E) and (F) is too high, the degree of swelling of the copolymer may exceed 20%, and the hardly swellable coating 7 having desired properties may not be obtained.

The number average molecular weight of the hardly swellable resin is preferably 100,000 to 1,000,000, and more preferably 300,000 to 600,000. This improves the adhesion of the hardly swellable coating 7 to the outer surface of the negative electrode active material layer 22, and the hardly swellable coating 7 is unlikely to be separated from the outer surface of the negative electrode active material layer 22 even after an increased number of charge/discharge cycles.

By setting the number average molecular weight within the foregoing range, the adhesion of the hardly swellable coating 7 to the outer surface of the negative electrode active material layer 22 is improved, and the possibility that the hardly swellable coating 7 is separated from the outer surface of the negative electrode active material layer 22 when the number of charge/discharge cycles is increased is reduced. In addition, the ability of the negative electrode 4 to absorb non-aqueous electrolyte can be readily lowered suitably, and the deterioration in the circulation of non-aqueous electrolyte in the positive electrode 3 can be readily suppressed. Further, the lithium ion conductivity of the hardly swellable coating 7 can be sufficiently ensured, and the deterioration in the load characteristics of the battery 1 can be suppressed.

The content in the negative electrode 4 of the hardly swellable resin constituting the hardly swellable coating 7 is preferably 0.1 parts by mass to 30 parts by mass and more preferably 0.5 parts by mass to 5 parts by mass, per 100 parts by mass of the alloy-formable active material contained in the negative electrode main body 4a.

By setting the content of the hardly swellable resin within the foregoing range, the ability of the negative electrode 4 to absorb non-aqueous electrolyte can be readily lowered suitably due to the presence of the hardly swellable coating 7, and the deterioration in the circulation of non-aqueous electrolyte in the positive electrode 3 can be readily suppressed. Further, the property of the hardly swellable coating 7 to lower the non-aqueous electrolyte-absorbing ability of the negative electrode 4 is not excessively enhanced, and the lithium ion conductivity of the hardly swellable coating 7 can be sufficiently ensured. As a result, the deterioration in the cycle characteristics and load characteristics of the battery 1 can be effectively suppressed.

The thickness of the hardly swellable coating 7 is not particularly limited, but is preferably 0.1 μm to 2 μm. This can provide the hardly swellable coating 7 having both a property capable of suitably lowering the non-aqueous electrolyte-absorbing ability of the negative electrode 4 and lithium ion conductivity in a well-balanced manner.

By setting the thickness of the hardly swellable coating 7 within the foregoing range, the ability of the negative electrode 4 to absorb non-aqueous electrolyte can be readily lowered suitably, the circulation of non-aqueous electrolyte within the battery 1 can be effectively improved, and the deterioration in the cycle characteristics of the battery 1 can be readily suppressed. In addition, the mechanical strength of the hardly swellable coating 7 is unlikely to be lowered, and a separation of the hardly swellable coating 7 from the outer surface of the negative electrode active material layer 22 is unlikely to occur. Further, the lithium ion conductivity of the hardly swellable coating 7 can be readily ensured sufficiently, and the deterioration in the load characteristics of the battery 1 can be suppressed.

In this embodiment, it is preferable to select an easily swellable resin and a hardly swellable resin so that the difference between the degree of swelling with non-aqueous electrolyte of the easily swellable resin and that of the hardly swellable resin is, for example, from 3 to 60% or from 3 to 190%, preferably from 10% to 150%, and more preferably from 65% to 100%. This can further improve the circulation of non-aqueous electrolyte within the battery 1. By setting the difference in the degree of swelling suitably, the circulation of non-aqueous electrolyte within the battery 1 can be effectively improved. In addition, the non-aqueous electrolyte can be sufficiently dispersed throughout the negative electrode 4, and the deterioration in the cycle characteristics and load characteristics of the battery 1 can be effectively suppressed.

The negative electrode current collector 20 is a metal foil made of a metal material such as copper, a copper alloy, stainless steel, and nickel, and has a plurality of the protrusions 21 on both surfaces 20a thereof. The protrusion 21 is a projection extending outward from the surface 20a of the negative electrode current collector 20. The protrusions 21 are spaced apart from each other, and a gap with a predetermined size is present between a pair of the adjacent protrusions 21 selected at random from a plurality of the protrusions 21. The thickness of a portion of the negative electrode current collector 20 where no protrusion 21 is formed is preferably 5 μm to 30 μm. Although the negative electrode current collector 20 has the protrusions 21 on both surfaces thereof in this embodiment, but it may have the protrusions 21 only on one surface thereof. The negative electrode current collector 20 is belt-shaped in this embodiment.

The negative electrode active material layer 22 includes a plurality of the particulate bodies 23 supported on the surfaces of the protrusions 21 of the negative electrode current collector 20. The particulate bodies 23 including an alloy-formable active material extend outward from the surfaces of the protrusions 21 of the negative electrode current collector 20. In this embodiment, the particulate bodies 23 comprise an alloy-formable active material, and one particulate body 23 is formed on one protrusion 21. In a discharged state, the gap 24 is present between the particulate bodies 23 adjacent to each other. Specifically, the particulate bodies 23 are spaced apart from each other, and the gap 24 is present between a pair of the adjacent particulate bodies 23 selected at random from a plurality of the particulate bodies 23. These gaps 24 serve to reduce the stress generated with changes in volume of the alloy-formable active material. As a result, the separation of the particulate body 23 from the protrusion 21, and deformation of the negative electrode current collector 20 and the negative electrode main body 4a can be suppressed. Therefore, by using the negative electrode main body 4a configured as above, it is possible to remarkably suppress the deterioration in the cycle characteristics attributed to expansion and contraction of the alloy-formable active material.

In the negative electrode active material layer 22, due to the presence of the gaps 24 around the particulate bodies 23, plus the generation of small voids in each particulate body 23 with increase in the number of charge/discharge cycles, the ability of the negative electrode 4 to absorb non-aqueous electrolyte during discharge is remarkably improved. Therefore, by forming the hardly swellable coating 7 on the outer surface of the negative electrode active material layer 22 as above, the circulation of non-aqueous electrolyte within the battery 1 is significantly improved.

The alloy-formable active material constituting the particulate bodies 23 is a material that absorbs lithium by alloying with lithium, and reversibly absorbs and releases lithium ions at a negative electrode potential. The alloy-formable active material is preferably amorphous or low crystalline. Any known alloy-formable active material may be used as the alloy-formable active material, but preferred are a silicon-based active material and a tin-based active material. These alloy-formable active materials may be used singly or in combination of two or more.

The silicon-based active material is not particularly limited, but may be, for example, silicon, a silicon compound, or a silicon alloy. Examples of the silicon compound include a silicon oxide represented by the formula: $SiO_a$, where $0.05<a<1.95$; a silicon carbide represented by the formula: $SiC_b$, where $0<b<1$; and a silicon nitride represented by the formula: $SiN_c$, where $0<c<4/3$. Some of the silicon atoms contained in silicon and the silicon compound may be replaced with a different element (I). Examples of the different element (I) include B, Mg, Ni, Ti, Mo, Co, Ca, Cr, Cu, Fe, Mn, Nb, Ta, V, W, Zn, C, N, and Sn. Examples of the silicon alloy include an alloy of silicon and a different element (J). Examples of the different element (J) include Fe, Co, Sb, Bi, Pb, Ni, Cu, Zn, Ge, In, Sn, and Ti. Preferred among these silicon-based active materials are silicon and the silicon oxide.

The tin-based active material may be, for example, tin, a tin compound, or a tin alloy. Examples of the tin compound include a tin oxide represented by the formula: $SnO_d$, where $0<d<2$, a tin dioxide ($SnO_2$), $SnSiO_3$, and a tin nitride. Examples of the tin alloy include an alloy of tin and a different element (K). The different element (K) is at least one selected from the group consisting of Ni, Mg, Fe, Cu, and Ti. Such an alloy is exemplified by $Ni_2Sn_4$ or $Mg_2Sn$.

Examples of the arrangement of the protrusions 21 on the surface 20a of the negative electrode current collector 20 include a staggered arrangement, a closest-packed arrangement, a lattice arrangement, or a grid arrangement. Alternatively, the protrusions 21 may be arranged irregularly.

The height of the protrusion 21 is the length of a perpendicular from the tip end of the protrusion 21 to the surface 20a, measured on a cross section of the negative electrode 4. The height of the protrusion 21 is preferably 3 µm to 15 µm. The height of the protrusion 21 can be determined by observing a cross section of the negative electrode 4 under a scanning electron microscope, measuring the heights of, for example, 100 protrusions 21, and averaging the obtained measured values.

The width of the protrusion 21 is a maximum length of the protrusion 21 measured in parallel with the surface 20a on a cross section of the negative electrode 4. The width of the protrusion 21 is preferably 5 µm to 20 µm. The width of the protrusion 21 can be determined by observing a cross section of the negative electrode 4 under a scanning electron microscope, measuring the widths of, for example, 100 protrusions 21, and averaging the obtained measured values.

All of the protrusions 21 need not have the same height or the same width.

The shape of the protrusion 21 on an orthographic projection of the negative electrode current collector 20 when viewed from above is, for example, a polygon from a triangle to an octagon, a circle, or an ellipse. The polygon includes a rhombus, a parallelogram, and a trapezoid.

The number of the protrusions 21 is preferably $10,000/cm^2$ to $10,000,000/cm^2$. The axis-to-axis distance between the protrusions 21 adjacent to each other is preferably 10 µm to 100 µm. Provided that the shape of the protrusion 21 is a polygon, the axis of the protrusion 21 is a line passing through a point of intersection of diagonals of the polygon and extending in the direction perpendicular to the surface 20a. Provided that the shape of the protrusion 21 is an ellipse, the axis of the protrusion 21 is a line passing through a point of intersection of major and minor axes of the ellipse and extending in the direction perpendicular to the surface 20a. Provided that the shape of the protrusion 21 is a circle, the axis of the protrusion 21 is a line passing through the center of the circle and extending in the direction perpendicular to the surface 20a.

In forming the negative electrode current collector 20, for example, two rollers for forming protrusions each having a plurality of recesses formed on its surface are press-fitted to each other with the axes thereof being arranged in parallel with each other, to provide a nipping portion, and a metal foil is passed through the nipping portion to be press-molded. As a result, the protrusions 21 each having a shape and size substantially corresponding to the shape and size of the inner space of the recess and having a flat top surface almost parallel to the surface 20a are formed on both surfaces of the metal foil in an arrangement corresponding to that of the recesses on the surfaces of the rollers for forming protrusions, whereby the negative electrode current collector 20 is obtained. The rollers for forming protrusions can be prepared by, for example, shaping recesses by laser machining on the surface of a roller at least the surface of which is made of forged steel.

The particulate bodies 23 can be simultaneously formed on the surfaces of the protrusions 21 by a vapor phase method. Examples of the vapor phase method include vacuum vapor deposition, sputtering, ion plating, laser ablation, chemical vapor deposition, plasma chemical vapor deposition, and thermal spraying. Preferred among these is vacuum vapor deposition.

FIG. 4 is a longitudinal cross-sectional view schematically showing the configuration of the particulate body 23. Each of the particulate bodies 23 is formed as a stack of masses 23a to 23h as shown in FIG. 4. It should be noted that the number of masses is not limited to eight, and any number of two or more masses may be stacked.

In forming the particulate body 23 being a stack of the masses 23a to 23h, first, the mass 23a to be supported on the surface of the protrusion 21 is formed. Secondly, the mass 23b is formed such that it is supported on the remaining surface of the protrusion 21 and the surface of the mass 23a. Thirdly, the mass 23c is formed such that it is supported on the remaining surface of the mass 23a and the surface of the mass 23b. Further, the mass 23d is formed such that it is supported on the remaining surface of the mass 23b and the surface of the mass 23c. In the same manner as above, the masses 23e, 23f, 23g, and 23h are formed one after another, and the particulate body 23 is thus formed. The method of forming the particulate body 23 is detailed in Examples.

The height of the particulate body 23 is the length of a perpendicular from the tip end of the particulate body 23 to the flat top surface of the protrusion 21, measured on a cross section of the negative electrode 4. The height of the particulate body 23 is preferably 5 µm to 30 µm. The width of the particulate body 23 is a maximum length of the particulate body 23 measured in parallel with the surface 20a on a cross section of the negative electrode 4. The width of the particulate body 23 is preferably 5 µm to 30 µm. The height and width of the particulate body 23 can be determined by observing a cross section of the negative electrode 4 under a scanning electron microscope, in the same manner as determining the height and width of the protrusion 21.

The three-dimensional shape of the particulate body 23 may be, for example, cylindrical, prismatic, spindle-like, or approximately spherical.

Although the negative electrode main body 4a including the negative electrode current collector 20 having the protrusions 21 on both surfaces thereof and the negative electrode active material layer 22 being an aggregate of the particulate bodies 23 is used in this embodiment, any negative electrode main body may be used without limitation. For example, a negative electrode main body in which a dense thin film (a solid film) comprising an alloy-formable active material is formed by a vapor phase method on the surface of the negative electrode current collector 20 or on a negative electrode current collector with no protrusion 21 may be used.

The separator 5 interposed between the positive electrode 3 and the negative electrode 4 may be, for example, a porous sheet which has pores, a non-woven fabric of resin fibers, or a woven fabric of resin fibers. Preferred among these is a porous sheet, and more preferred is a porous sheet having a pore diameter of about 0.05 µm to 0.15 µm. The thicknesses of the porous sheet, non-woven fabric, and woven fabric are preferably 5 µm to 30 µm. Examples of the resin material constituting the porous sheet and resin fibers include: polyolefins, such as polyethylene or polypropylene; polyamides; and polyamide-imides. The separator 5 of this embodiment is belt-shaped.

The non-aqueous electrolyte includes a lithium salt and a non-aqueous solvent. Examples of the lithium salt include $LiPF_6$, $LiClO_4$, $LiBF_4$, $LiAlCl_4$, $LiSbF_6$, LiSCN, $LiAsF_6$, $LiB_{10}Cl_{10}$, LiCl, LiBr, LiI, $LiCO_2CF_3$, $LiSO_3CF_3$, $Li(SO_3CF_3)_2$, $LiN(SO_2CF_3)_2$, and lithium imide salts. These lithium salts may be used singly or in combination of two or more. The concentration of the lithium salt in 1 L of the non-aqueous solvent is preferably 0.2 mol to 2 mol, and more preferably 0.5 mol to 1.5 mol.

Examples of the non-aqueous solvent include: cyclic carbonic acid esters, such as ethylene carbonate, propylene carbonate, and butylene carbonate; chain carbonic acid esters, such as dimethyl carbonate, ethyl methyl carbonate, and diethyl carbonate; chain ethers, such as 1,2-dimethoxyethane and 1,2-diethoxy ethane; cyclic carboxylic acid esters, such as γ-butyrolactone and γ-valerolactone; and chain carboxylic acid esters, such as methyl acetate. These non-aqueous solvents may be used singly or in combination of two or more.

Figure 5:
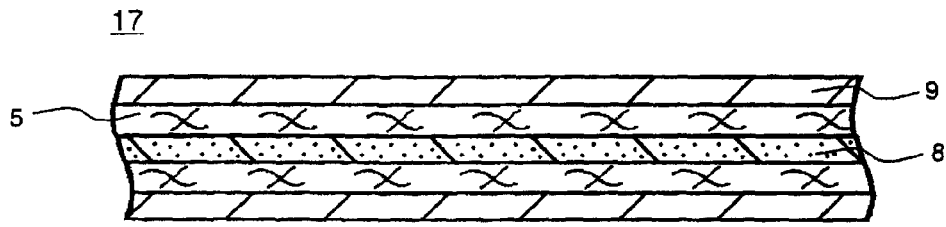
FIG. 5 A longitudinal cross-sectional view schematically showing the configuration of an essential part of a lithium ion secondary battery according to another embodiment of the present invention.

FIG. 5 is a longitudinal cross-sectional view schematically showing the configuration of an essential part of a lithium ion secondary battery according to another embodiment of the present invention. The lithium ion secondary battery of this embodiment has the same configuration as the battery 1, except that it includes an electrode group 17 in place of the electrode group 2.

The electrode group 17 includes a positive electrode 8, a negative electrode 9, and the separator 5. The positive electrode 8 includes a positive electrode active material layer and a positive electrode current collector. The positive electrode active material layer includes positive electrode active material particles and an easily swellable resin. The easily swellable resin bonds the positive electrode active material particles together and allows the positive electrode active material particles to adhere to the positive electrode current collector. The negative electrode 9 includes a negative electrode active material layer and a negative electrode current collector. The negative electrode active material layer includes alloy-formable active material particles and a hardly swellable resin. The hardly swellable resin bonds alloy-formable active material particles together and allows the alloy-formable active material particles to adhere to the negative electrode current collector. The electrode group 17 is obtained by winding the positive electrode 8 and the negative electrode 9 with the separator 5 interposed therebetween. By configuring as above, the difference between the non-aqueous electrolyte-absorbing ability of the positive electrode 8 and that of the negative electrode 9 is reduced, and the circulation of non-aqueous electrolyte within the battery can be improved.

The positive electrode active material layer in the positive electrode 8 can be formed in the same manner as forming the positive electrode active material layer in the battery 1, except that the binder is changed to an easily swellable resin. The content of the easily swellable resin in the positive electrode active material layer is preferably 1 part by mass to 15 parts by mass, and more preferably 2 parts by mass to 8 parts by mass, per 100 parts by mass of the positive electrode active material particles. The easily swellable resin may be the same easily swellable resin as used in the battery 1. The easily swellable resin may be used in combination with a conventionally-used binder.

The negative electrode active material layer in the negative electrode 9 can be formed in the same manner as forming the negative electrode active material layer in the battery 1, except that alloy-formable active material particles are used, and the binder is changed to a hardly swellable resin. The content of the hardly swellable resin in the negative electrode active material layer is preferably 0.1 parts by mass to 10 parts by mass, and more preferably 0.5 parts by mass to 5 parts by mass, per 100 parts by mass of the alloy-formable active material particles. The hardly swellable resin may be the same hardly swellable resin as used in the battery 1. The hardly swellable resin may be used in combination with a conventionally-used binder.

Figure 6:
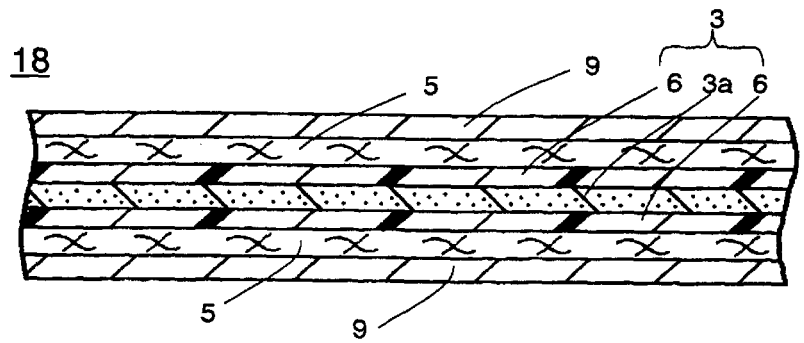
FIG. 6 A longitudinal cross-sectional view schematically showing the configuration of an essential part of a lithium ion secondary battery according to yet another embodiment of the present invention.

FIG. 6 is a longitudinal cross-sectional view schematically showing the configuration of an essential part of a lithium ion secondary battery according to yet another embodiment of the present invention. The lithium ion secondary battery of this embodiment has the same configuration as the battery 1, except that it includes an electrode group 18 in place of the electrode group 2.

The electrode group 18 includes: the positive electrode 3 with the easily swellable coatings 6 on both outer surfaces in the thickness direction thereof; the negative electrode 9 including a negative electrode current collector, and a negative electrode active material layer comprising alloy-formable active material particles bonded together and allowed to adhere to the negative electrode current collector by a hardly-swellable resin; and the separator 5. The electrode group 18 is obtained by winging the positive electrode 3 and the negative electrode 9 with the separator 5 interposed therebetween. By configuring as above, the difference between the non-aqueous electrolyte-absorbing ability of the positive electrode 3 and that of the negative electrode 9 is reduced, and thus, the circulation of non-aqueous electrolyte within the battery can be improved.

Figure 7:
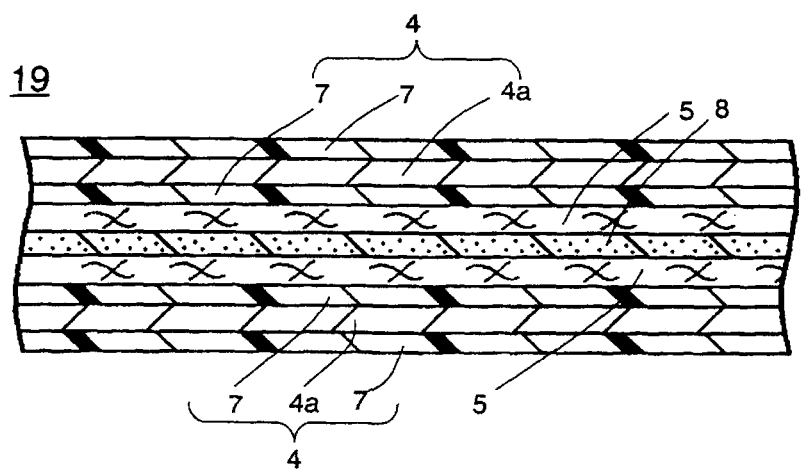
FIG. 7 A longitudinal cross-sectional view schematically showing the configuration of an essential part of a lithium ion secondary battery according to still another embodiment of the present invention.

FIG. 7 is a longitudinal cross-sectional view schematically showing the configuration of an essential part of a lithium ion secondary battery according to still another embodiment of the present invention. The lithium ion secondary battery of this embodiment has the same configuration as the battery 1, except that it includes an electrode group 19 in place of the electrode group 2.

The electrode group 19 includes: the positive electrode 8 including a positive electrode current collector, and a positive electrode active material layer comprising alloy-formable active material particles bonded together and allowed to adhere to the positive electrode current collector by an easily-swellable resin; and the negative electrode 4 with the hardly swellable coatings 7 on both outer surfaces in the thickness direction thereof. The electrode group 19 is obtained by winging the positive electrode 8 and the negative electrode 4 with the separator 5 interposed therebetween. By configuring as above, the difference between the non-aqueous electrolyte-absorbing ability of the positive electrode 8 and that of the negative electrode 4 is reduced, and thus, the circulation of non-aqueous electrolyte within the lithium ion secondary battery of this embodiment can be improved.

Although the above-described lithium ion secondary battery of each embodiment is a cylindrical battery including a wound electrode group, the lithium ion secondary battery of the present invention may be of any form, without limitation. Examples of the form include: a cylindrical battery including a battery case accommodating a wound electrode group and a non-aqueous electrolyte, the battery case being sealed by an insulating material-made sealing plate supporting a positive electrode terminal thereon; a prismatic battery including a prismatic battery case accommodating a wound, flat or stacked electrode group; a laminate film battery including a laminate film-made battery case accommodating a wound, flat or stacked electrode group; and a coin battery including a coin battery case accommodating a stacked electrode group.

EXAMPLES

The present invention is described below in detail by way of Examples and Comparative Examples.

Example 1

(a) Production of Positive Electrode 3

First, 85 parts by mass of a positive electrode active material ($LiNi_{0.85}Co_{0.15}Al_{0.05}O_2$), 10 parts by mass of graphite powder, and 5 parts by mass of polyvinylidene fluoride (a binder, degree of swelling: 12%) were mixed with an appropriate amount of N-methyl-2-pyrrolidone, to prepare a positive electrode material mixture slurry. The positive electrode material mixture slurry was applied onto both surfaces of a 15-μm-thick aluminum foil (a positive electrode current collector), and the resultant applied film was dried and rolled, to form the positive electrode main body 3a having a thickness of 130 μm.

(b) Formation of Easily Swellable Coating 6

A copolymer of vinylidene fluoride and hexafluoropropylene (content of hexafluoropropylene units: 0.2 mol %, degree of swelling: 20%, number average molecular weight: 300,000, hereinafter referred to as a "VDF-HFP copolymer (1)") was dissolved in N-methyl-2-pyrrolidone, to prepare a 3 mass % N-methyl-2-pyrrolidone solution of the VDF-HFP copolymer (1). This solution (liquid temperature: 25° C.) was applied by roll coating onto the surfaces of the positive electrode active material layers of the positive electrode main body 3a obtained in the above, and dried at 110° C. for 30 minutes, to form the easily swellable coatings 6 each having a thickness of 4 μm. The positive electrode 3 was thus produced.

The positive electrode 3 obtained in the above was cut to a width that could be inserted into a battery case for a 14400 cylindrical battery (diameter: about 14 mm, height: about 40 mm).

(c) Production of Negative Electrode 4

(c-1) Formation of Negative Electrode Current Collector 20

Two forged steel rollers each having a plurality of recesses, each of which has a rhombic opening, formed on its surface in a staggered arrangement are press-fitted to each other with the axes thereof being arranged in parallel with each other, to provide a nipping portion. A 35-μm-thick electrolytic copper foil (available from Furukawa Circuit Foil Co., Ltd.) was passed through the nipping portion at a line pressure of 1000 N/cm, to prepare the negative electrode current collector 20 having the protrusions 21 formed on both surfaces thereof.

The protrusions 21 had an average height of 8 μm, and were arranged in a staggered arrangement. The top of the protrusion 21 was a flat surface almost parallel to the surface 20a of the negative electrode current collector 20. The shape of the protrusion 21 on an orthographic projection of the negative electrode current collector 20 when viewed from above was an approximate rhombus. The axis-to-axis distance between the protrusions 21 was 20 μm in the longitudinal direction of the negative electrode current collector 20, and 40 μm in the lateral direction thereof.

(c-2) Formation of Negative Electrode Main Body 4a

Figure 8:
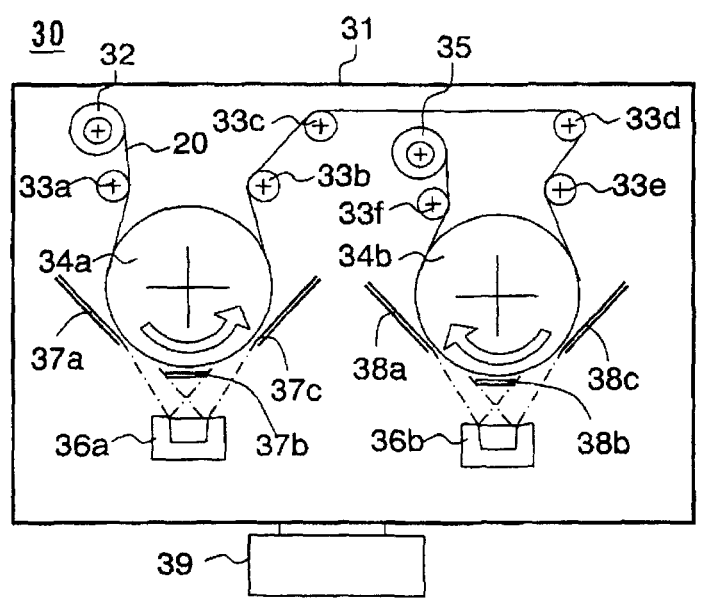
FIG. 8 A front view schematically showing the configuration of an electron beam vacuum vapor deposition apparatus.

FIG. 8 is a side view schematically showing the configuration of an electron beam vacuum vapor deposition apparatus 30 (available from ULVAC, Inc., hereinafter referred to as a "vapor deposition apparatus 30"). In FIG. 8, the solid line shows the members arranged inside the vapor deposition apparatus 30. The particulate bodies 23 were formed on the surfaces of the protrusions 21 (not shown in FIG. 8) of the negative electrode current collector 20 obtained in the above, using the vacuum vapor deposition apparatus 30. The negative electrode main body 4a was thus produced.

In the vacuum vapor deposition apparatus 30, a vacuum pump 39 for evacuating a chamber 31 being a pressure-resistant container is arranged outside the chamber 31. The following members are provided inside the chamber 31. On a supply roller 32, a roll of the belt-like negative electrode current collector 20 is mounted. Conveying rollers 33a, 33b, 33c, 33d, 33e, and 33f convey the negative electrode current collector 20 supplied from the supply roller 32. The film formation rollers 34a and 34b are each provided with a cooling means (not shown) in its interior, and allow an alloy-formable active material to be deposited on the surface the negative electrode current collector 20 while running on the surfaces of the film formation rollers 34a and 34b. A take-up roll 35 takes up the negative electrode current collector 20 conveyed thereto.

Vapor deposition sources 36a and 36b accommodate a raw material of alloy-formable active material. Irradiation of electron beams from an electron beam generator (not shown) to the vapor deposition sources 36a and 36b causes vapor of the raw material of alloy-formable active material to be generated. Shielding plates 37 and 38 limit the region where the vapor of raw material of alloy-formable active material is to be supplied onto the surface of the negative electrode current collector 20. The shielding plate 37 comprises shielding strips 37a, 37b, and 37c. The shielding plate 38 comprises shielding strips 38a, 38b, and 38c. In the direction along which the negative electrode current collector 20 is conveyed, a first vapor-deposition region is formed between the shielding strips 37a and 37b, a second vapor-deposition region is formed between the shielding strips 37b and 37c, a third vapor-deposition region is formed between the shielding strips 38c and 38b, and a fourth vapor-deposition region is formed between the shielding strips 38b and 38a. An oxygen nozzle (not shown) is arranged in the vicinity of each vapor-deposition region, and oxygen is supplied therefrom.

The raw material of alloy-formable active material used here was a scrap silicon (monocrystalline silicon, purity: 99.9999%, available from Shin-Etsu Chemical Co., Ltd.), which was placed in the vapor deposition sources 36a and 36b. The chamber 31 was evacuated by the vacuum pump 39 to a pressure of $5 \times 10^{-3}$ Pa, and then supplied with oxygen from the oxygen nozzles, to have an oxygen atmosphere with a pressure of 3.5 Pa. Subsequently, electron beams (accelerating voltage: 10 kV, emission: 500 mA) was radiated to the scrap silicon placed in the vapor deposition sources 36a and 36b, to generate vapor of silicon. The vapor of silicon, while going up, is mixed with oxygen, to produce a mixed gas of silicon vapor and oxygen.

On the other hand, the negative electrode current collector 20 was fed from the supply roller 32 at a rate of 2 cm/min, to vapor-deposit the mixture of silicon vapor and oxygen onto the protrusions 21 of the negative electrode current collector 20 while passing through the first vapor-deposition region, whereby the masses 23a shown in FIG. 4 were formed. Next, the masses 23b were formed on the protrusions 21 and the masses 23a of the negative electrode current collector 20 while passing through the second vapor-deposition region. Further, in the third and fourth vapor-deposition regions, the masses 23a and 23b were formed on the protrusions 21 on the side opposite to the side where the masses 23a and 23b had been formed in the first and second vapor-deposition regions.

Next, the supply roller 32 and the take-up roller 35 were rotated in the reverse direction, to convey the negative electrode current collector 20 in the reverse direction, so that the masses 23c and 23d were formed on the masses 23a and 23b on both sides of the negative electrode current collector 20. This vapor deposition in forward and reverse directions was performed again in the same manner, to form the particulate bodies 23 each being a stack of the masses 23a, 23b, 23c, 23d, 23e, 23f, 23g, and 23h on the protrusions 21 on both sides of the negative electrode current collector 20.

The particulate bodies 23 were supported on the surfaces of the protrusions 21, and had grown outwardly from the negative electrode current collector 20. The three-dimensional shape of each particulate body 23 was approximately cylindrical. The particulate bodies 23 had an average height of 20 μm and an average width of 35 μm. The content of oxygen in the particulate bodies 23 was determined by a combustion method, and the result found that the composition of the particulate bodies 23 was $SiO_{0.5}$. The belt-like negative electrode main body 4a was thus obtained.

Figure 9:
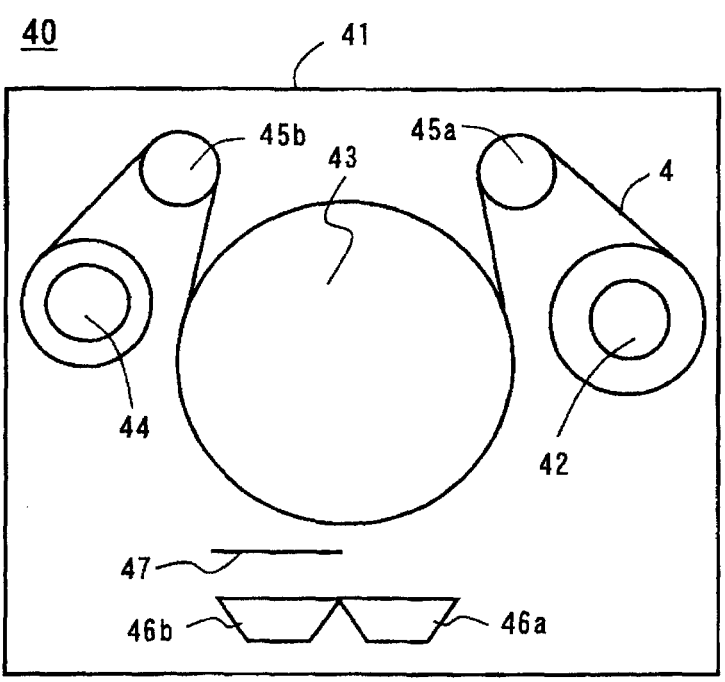
FIG. 9 A front view schematically showing the configuration of another vacuum vapor deposition apparatus.

FIG. 9 is a side view schematically showing the configuration of another electron beam vacuum vapor deposition apparatus. In FIG. 9, the solid line shows the members arranged inside the vapor deposition apparatus 30. To the negative electrode active material layer 22 comprising a plurality of the particulate bodies 23 in the belt-like negative electrode main body 4a obtained in the above, lithium was supplemented in an amount equivalent to the irreversible capacity, using the vapor deposition apparatus 40. The vapor deposition apparatus 40 includes a chamber 41 being a pressure-resistant container, and the following members are provided inside the chamber 41.

On a supply roller 42, a roll of the belt-like negative electrode main body 4a is mounted. A can 43 is provided with a cooler (not shown) in its interior, and allows lithium to be deposited on the surface of the negative electrode main body 4a while running on the surface of the can 43. A take-up roller 44 takes up the negative electrode main body 4a. Conveying rollers 45a and 45b convey the negative electrode main body 4a supplied from the supply roller 42 toward the take-up roller 44 via the can 43. Vapor deposition sources 46a and 46b made of tantalum accommodate metallic lithium. Vapor of lithium is generated by heating the vapor deposition sources 46a and 46b. A shielding plate 47 limits the supply of vapor of lithium to the surface of the negative electrode main body 4a.

First, the atmosphere in the chamber 41 was replaced with an argon atmosphere, and the chamber 41 was evacuated by a vacuum pump (not shown) to a degree of vacuum of $1 \times 10^{-1}$ Pa. Next, a current of 50 A was passed through the vapor deposition sources 46a and 46b, to generate vapor of lithium, and at the same time, the negative electrode main body 4a was fed from the supply roller 42 at a rate of 2 cm/min, to allow lithium to be deposited in an amount equivalent to the irreversible capacity, on the surface of the negative electrode active material layer 22 in the negative electrode main body 4a, while the negative electrode main body 4a was running on the surface of the can 43. Lithium was vapor-deposited on the negative electrode active material layers 22 on both sides of the negative electrode main body 4a. The negative electrode main body 4a with lithium vapor-deposited thereon was cut to a width that could be inserted into a battery case for a 14400 cylindrical battery (diameter: about 14 mm, height: about 40 mm).

(d) Formation of Hardly Swellable Coating 7

A copolymer of vinylidene fluoride and hexafluoropropylene (content of hexafluoropropylene units: 0.1 mol %, degree of swelling: 16%, number average molecular weight: 400, 000, hereinafter referred to as a "VDF-HFP copolymer (2)") was dissolved in N-methyl-2-pyrrolidone, to prepare a 1 mass % N-methyl-2-pyrrolidone solution of the VDF-HFP copolymer (2). This solution (liquid temperature: 25° C.) was applied by roll coating onto the surfaces of the negative electrode active material layers 22 in the negative electrode main body 4a obtained in the above, and dried at 110° C. for 30 minutes, to form the hardly swellable coatings 7 each having a thickness of 1 μm. The negative electrode 4 was thus produced. The difference between the degree of swelling of the easily swellable resin and that of the hardly swellable resin was 4%.

(e) Preparation of Non-Aqueous Electrolyte

LiPF$_6$ was dissolved at a concentration of 1.0 mol/L in a 1:1 by volume mixed solvent of ethylene carbonate and ethyl methyl carbonate, to prepare a non-aqueous electrolyte.

(f) Fabrication of Battery

The positive and negative electrodes obtained in the above were wound with a 20-μm-thick separator (trade name: Hipore, a polyethylene porous film, available from Asahi Kasei Corporation) interposed therebetween, to give a wound electrode group. One end of an aluminum lead was connected to the positive electrode current collector, and one end of a nickel lead was connected to the negative electrode current collector. Upper and bottom insulating plates made of polypropylene were mounted on both ends of the wound electrode group in the longitudinal direction thereof, respectively. Next, the wound electrode group was inserted into a bottomed cylindrical battery case made of iron. The other end of the aluminum lead was connected to a sealing plate made of stainless steel, and the other end of the nickel lead was connected to the bottom inner surface of the battery case.

The non-aqueous electrolyte was injected into the battery case while the battery case was being evacuated. A gasket made of polypropylene was mounted at the periphery of the sealing plate supporting a safety valve, and in this state, the sealing plate was disposed at the opening of the battery case. The opening end of the battery case was crimped toward the sealing plate, to hermetically seal the battery case. In such a manner, a 14400 cylindrical lithium ion secondary battery having an outer diameter of 14 mm and a height of 40 mm was fabricated.

Example 2

A cylindrical lithium ion secondary battery was fabricated in the same manner as in Example 1, except that in (b) Formation of easily swellable coating, a VDF-HFP copolymer (3) was used in place of the VDF-HFP copolymer (1). The VDF-HFP copolymer (3) had a HFP content of 10 mol %, a degree of swelling of 200%, and a number average molecular weight of 300,000. The difference between the degree of swelling of the easily swellable resin and that of the hardly swellable resin was 184%.

Example 3

A cylindrical lithium ion secondary battery was fabricated in the same manner as in Example 1, except that in (b) Formation of easily swellable coating, a VDF-HFP copolymer (4) was used in place of the VDF-HFP copolymer (1). The VDF-HFP copolymer (4) had a HFP content of 6 mol %, a degree of swelling of 100%, and a number average molecular weight of 400,000. The difference between the degree of swelling of the easily swellable resin and that of the hardly swellable resin was 84%.

Example 4

A cylindrical lithium ion secondary battery was fabricated in the same manner as in Example 1, except that in (d) Formation of hardly swellable coating, polyvinylidene fluoride (degree of swelling: 14%, number average molecular weight: 400,000) was used in place of the VDF-HFP copolymer (2), and the thickness of the hardly swellable coating was changed to 1 μm. The difference between the degree of swelling of the easily swellable resin and that of the hardly swellable resin was 6%.

Example 5

A cylindrical lithium ion secondary battery was fabricated in the same manner as in Example 1, except that in (d) Formation of hardly swellable coating, polytetrafluoroethylene (degree of swelling: 5%, number average molecular weight: 400,000) was used in place of the VDF-HFP copolymer (2), and the thickness of the hardly swellable coating was changed to 1 μm. The difference between the degree of swelling of the easily swellable resin and that of the hardly swellable resin was 15%.

Example 6

A cylindrical lithium ion secondary battery was fabricated in the same manner as in Example 1, except that the thickness of the easily swellable coating was changed to 5 μm.

Example 7

A cylindrical lithium ion secondary battery was fabricated in the same manner as in Example 1, except that the thickness of the hardly swellable coating was changed to 4 μm.

Example 8

A cylindrical lithium ion secondary battery was fabricated in the same manner as in Example 1, except that a positive electrode produced as below was used, and the easily swellable coating was not formed.

(a) Production of Positive Electrode

First, 85 parts by mass of a positive electrode active material (LiNi$_{0.85}$Co$_{0.15}$Al$_{0.05}$O$_2$), 10 parts by mass of graphite powder, and 5 parts by mass of the VDF-HFP copolymer (1) were mixed with an appropriate amount of N-methyl-2-pyrrolidone, to prepare a positive electrode material mixture slurry. The positive electrode material mixture slurry was applied onto both surfaces of a 15-μm-thick aluminum foil (a positive electrode current collector), and the resultant applied film was dried and rolled, to form a positive electrode having a thickness of 130 μm.

Comparative Example 1

A cylindrical lithium ion secondary battery was fabricated in the same manner as in Example 1, except that no easily swellable coating was formed on the surface of the positive electrode active material layer of the positive electrode.

Comparative Example 2

A cylindrical lithium ion secondary battery was fabricated in the same manner as in Example 1, except that no hardly swellable coating was formed on the surface of the negative electrode active material layer of the negative electrode.

Comparative Example 3

A cylindrical lithium ion secondary battery was fabricated in the same manner as in Example 1, except that the same hardly swellable coating as formed in Example 1 was formed on the surface of the positive electrode active material layer of the positive electrode, and the same easily swellable coating as formed in Example 1 was formed on the surface of the negative electrode active material layer of the negative electrode.

[Battery Capacity]

The batteries of Examples 1 to 8 and Comparative Examples 1 to 3 were respectively placed in a 25° C. constant temperature bath, and subjected to three charge/discharge cycles, each cycle consisting of charge (constant-current charge and subsequent constant-voltage charge) and discharge (constant-current discharge) performed under the following conditions, to determine a discharge capacity (0.2 C capacity) at the 3rd cycle, which was defined as a battery capacity.

Constant-current charge: 0.3 C, charge cut-off voltage 4.15 V

Constant-voltage charge: 4.15 V, charge cut-off current 0.05 C, interval 20 min

Constant-current discharge: 0.2 C, discharge cut-off voltage 2.5 V, interval 20 min

[Cycle Characteristics]

The batteries of Examples 1 to 8 and Comparative Examples 1 to 3, one from each, were respectively placed in a 25° C. constant temperature bath, and subjected to one charge/discharge cycle under the same conditions as in the evaluation of the battery capacity, to determine a discharge capacity at the 1st cycle. Thereafter, the subsequent 2nd cycle was performed under the same conditions as in the 1st cycle, except that the current value at the constant-current discharge was changed from 0.2 C to 1 C, and this cycle was repeated 198 times in total. Then, one charge/discharge cycle was performed under the same conditions in the 1st cycle, to determine a 0.2 C discharge capacity after 200 cycles. Further, one charge/discharge cycle was performed under the same conditions in the 2nd cycle, to determine a 1 C discharge capacity after 201 cycles.

The percentage of the 0.2 C discharge capacity after 200 cycles to the discharge capacity at the 1st cycle was calculated as a capacity retention rate A (%). The capacity retention rate A is a capacity retention rate when discharged at 0.2 C after 200 cycles. Further, the percentage of the 1 C discharge capacity after 201 cycles to the discharge capacity at the 1st cycle was calculated as a capacity retention rate B (%). The capacity retention rate B is a capacity retention rate when discharged at 1.0 C after 200 cycles. Furthermore, the percentage of the capacity retention rate B to the capacity retention rate A was calculated as a capacity retention rate C. The results are shown in Table 1.

TABLE 1

|  | Capacity retention rate A (%) | Capacity retention rate B (%) | Capacity retention rate C (%) |
| --- | --- | --- | --- |
| Ex. 1 | 78 | 69 | 69 |
| Ex. 2 | 84 | 74 | 74 |
| Ex. 3 | 80 | 71 | 71 |
| Ex. 4 | 77 | 67 | 67 |
| Ex. 5 | 77 | 66 | 66 |
| Ex. 6 | 78 | 59 | 59 |
| Ex. 7 | 70 | 49 | 49 |
| Ex. 8 | 65 | 48 | 48 |
| Com. Ex. 1 | 53 | 42 | 42 |
| Com. Ex. 2 | 59 | 51 | 51 |
| Com. Ex. 3 | 63 | 42 | 42 |

Table 1 shows that in a lithium ion secondary battery including an alloy-formable active material, either by forming an easily swellable coating on the outer surface of the positive electrode active material layer of the positive electrode, or by including an easily swellable resin in the positive electrode active material layer, and in addition, by forming a hardly swellable coating on the outer surface of the negative electrode active material layer of the negative electrode, the cycle characteristics of the battery can be improved, and an abrupt deterioration in the cycle characteristics can be suppressed even after an increased number of charge/discharge cycles.

The capacity retention rate A shows cycle characteristics at low output. The batteries of Examples 1 to 8 exhibited capacity retention rates as high as 65% or more in the discharge at low output, showing their excellent cycle characteristics. In particular, the capacity retention rates of the batteries of Examples 1 to 6 were very high, around 80%. Comparison of Examples 1 and 4 to 5 with Example 7 shows that by adjusting the thickness of the hardly swellable coating formed on the negative electrode surface, the cycle characteristics at low output can be maintained at a high level. Comparison of Example 1 with Example 8 shows that the cycle characteristics at low output can be maintained at a higher level, by forming an easily swellable coating on the positive electrode surface, rather than by allowing an easily swellable resin to be present in the positive electrode active material layer.

The capacity retention rate B shows cycle characteristics at high output. The batteries of Examples 1 to 6 exhibited capacity retention rates as high as 60% or more in the discharge at high output, showing their excellent cycle characteristics. In particular, the capacity retention rates of the batteries of Examples 1 to 3 were very high, around 70%. This shows that the cycle characteristics can be maintained at a higher level, by using as the easily swellable resin a vinylidene fluoride-hexafluoropropylene copolymer having a degree of swelling of 20% to 200%.

In contrast, the battery of Comparative Example 1, because of absence of the easily swellable coating on the positive electrode surface, failed to maintain the discharge capacity at a high level in both the discharge at low output and the discharge at high output, and therefore, was inferior to the batteries of Examples 1 to 8, in terms of the cycle characteristics. Likewise, the battery of Comparative Example 2, because of absence of the hardly swellable coating on the negative electrode surface, and the battery of Comparative Example 3, because of formation of the hardly swellable coating on the positive electrode surface and the easily swellable coating on the negative electrode surface, were inferior to the batteries of Examples 1 to 8, in terms of the cycle characteristics.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

INDUSTRIAL APPLICABILITY

The lithium ion secondary battery of the present invention can be used for the same application as those for the conventional lithium ion secondary batteries, and is particularly useful as a main power source or an auxiliary power source for, for example, electronic equipment, electric equipment, machining equipment, transportation equipment, and power storage equipment. Examples of the electronic equipment include personal computers, cellular phones, mobile devices, personal digital assistants, and portable game machines. Examples of the electric equipment include vacuum cleaners and video cameras. Examples of the machining equipment include electric powered tools and robots. Examples of the transportation equipment include electric vehicles, hybrid electric vehicles, plug-in HEVs, and fuel cell-powered vehicles. Examples of the power storage equipment include uninterrupted power supplies.

REFERENCE SIGNS LIST

1 Lithium ion secondary battery
2, 17, 18, 19 Wound electrode group
3, 8 Positive electrode
4, 9 Negative electrode
5 Separator
6 Easily swellable coating
7 Hardly swellable coating
10 Positive electrode lead
11 Negative electrode lead
12 Upper insulating plate
13 Lower insulating plate
14 Battery case
15 Sealing plate
16 Gasket
20 Negative electrode current collector
21 Protrusion
22 Negative electrode active material layer
23 Particulate body
24 Gap
30 Electron beam vacuum vapor deposition apparatus
40 Vacuum vapor deposition apparatus

The invention claimed is:

1. A lithium ion secondary battery comprising: a positive electrode including a positive electrode active material layer comprising a positive electrode active material capable of absorbing and releasing lithium ions, and a positive electrode current collector; a negative electrode including a negative electrode active material layer comprising an alloy-formable active material, and a negative electrode current collector; a separator interposed between the positive electrode and the negative electrode; and a non-aqueous electrolyte,
wherein the positive electrode active material layer has an easily swellable resin having a degree of swelling with the non-aqueous electrolyte of 20% or more, and
the negative electrode active material layer has a hardly swellable resin having a degree of swelling with the non-aqueous electrolyte of 2% to less than 20%.

2. The lithium ion secondary battery in accordance with claim 1, wherein the difference between the degree of swelling with the non-aqueous electrolyte of the easily swellable resin and the degree of swelling with the non-aqueous electrolyte of the hardly swellable resin is 10% to 150%.

3. The lithium ion secondary battery in accordance with claim 1, wherein the easily swellable resin is present as a coating formed on an outer surface of the positive electrode active material layer.

4. The lithium ion secondary battery in accordance with claim 3, wherein the coating of the easily swellable resin has a thickness of 1 µm to 5 µm.

5. The lithium ion secondary battery in accordance with claim 1, wherein the positive electrode active material layer includes a binder for allowing the positive electrode active material to adhere to the positive electrode current collector, the binder comprising the easily swellable resin.

6. The lithium ion secondary battery in accordance with claim 1, wherein the hardly swellable resin is present as a coating formed on an outer surface of the negative electrode active material layer.

7. The lithium ion secondary battery in accordance with claim 6, wherein the coating of the hardly swellable resin has a thickness of 0.1 µm to 2 µm.

8. The lithium ion secondary battery in accordance with claim 1, wherein the negative electrode active material layer includes a plurality of particulate bodies being supported on a surface of the negative electrode current collector and including the alloy-formable active material.

9. The lithium ion secondary battery in accordance with claim 1, wherein the negative electrode active material layer includes a binder for allowing the alloy-formable active material to adhere to the negative electrode current collector, the binder comprising the hardly swellable resin.

10. The lithium ion secondary battery in accordance with claim 1, wherein the easily swellable resin is at least one selected from the group consisting of (A) a copolymer of hexafluoropropylene and vinylidene fluoride containing 3 mol % to 20 mol % of hexafluoropropylene units, and (B) a copolymer of hexafluoropropylene and tetrafluoroethylene containing 3 mol % to 20 mol % of hexafluoropropylene units.

11. The lithium ion secondary battery in accordance with claim 1, wherein the hardly swellable resin is at least one selected from the group consisting of (C) polyvinylidene fluoride, (D) polytetrafluoroethylene, (E) a copolymer of hexafluoropropylene and vinylidene fluoride containing up to 1 mol % of hexafluoropropylene units, and (F) a copolymer of hexafluoropropylene and tetrafluoroethylene containing up to 1 mol % of hexafluoropropylene units.

12. The lithium ion secondary battery in accordance with claim 1, wherein the alloy-formable active material is at least one selected from the group consisting of a silicon-based active material and a tin-based active material.

13. The lithium ion secondary battery in accordance with claim 5, wherein an amount of the easily swellable resin in the binder is 1 part by mass to 15 parts by mass, per 100 parts by mass of the positive electrode active material.

* * * * *